Figure 1:
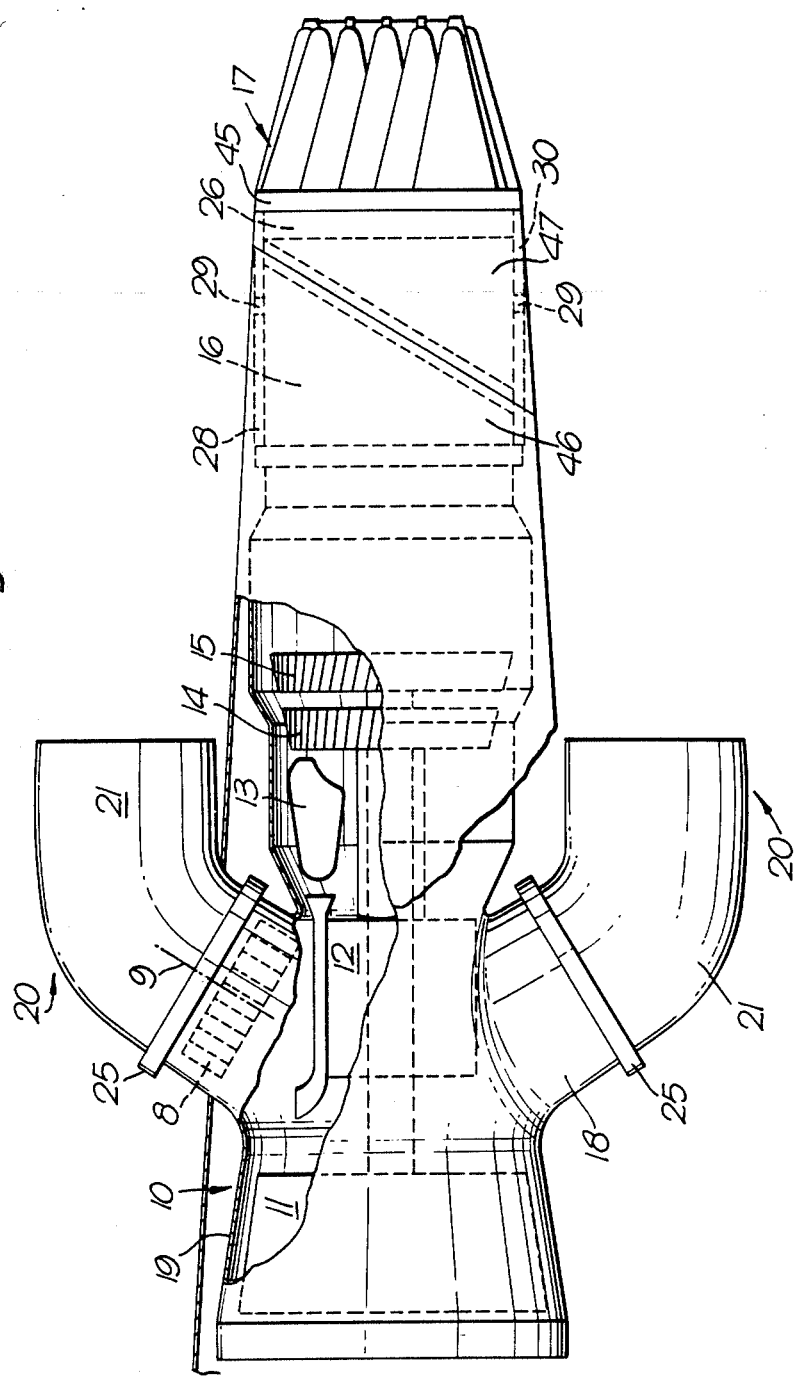

United States Patent [19]

Szuminski

[11] Patent Number: 4,550,877
[45] Date of Patent: Nov. 5, 1985

[54] STREAMLINED NOZZLE FOR TURBOMACHINES

[75] Inventor: Gary F. Szuminski, Marietta, Ga.

[73] Assignee: Rolls-Royce Inc., New York, N.Y.

[21] Appl. No.: 404,905

[22] Filed: Aug. 3, 1982

[51] Int. Cl.⁴ .............................................. F02K 1/78
[52] U.S. Cl. ................................. 239/265.35; 60/232; 244/12.4; 244/23 D
[58] Field of Search .................. 239/265.35; 244/12.4, 244/12.5, 23 D, 52; 60/228, 232

[56] References Cited
U.S. PATENT DOCUMENTS

| | | | |
|---|---|---|---|
| 3,064,923 | 11/1962 | Reiniger | 244/12.5 |
| 3,067,579 | 12/1962 | Olbrich | 244/23 D |
| 3,260,049 | 7/1966 | Johnson | 239/265.35 |
| 3,480,236 | 11/1969 | Nash | 239/265.35 |
| 3,633,847 | 1/1972 | Fricke et al. | 244/12.4 |
| 3,989,193 | 11/1976 | Vedova et al. | 239/265.35 |
| 4,363,445 | 12/1982 | Bouiller et al. | 239/265.35 |

Primary Examiner—Jeffrey V. Nase
Assistant Examiner—Michael J. Forman
Attorney, Agent, or Firm—Cushman, Darby & Cushman

[57] ABSTRACT

A vectorable nozzle 17 comprising a fixed first duct 21 a rotatable second duct 22 scarfed at its rear end and a rotatable third duct 23 scarfed at its front end. The second and third ducts 22,23 are mounted in bearings 24,26 respectively and the bearing 26 is constrained to swing bodily about trunnions 29, the axis of which lies transverse to the ducts 22,23, and a screw jack 32 is provided to rotate the bearing 26 about the trunnions 29. The second and third ducts 22,23 are provided with means to rotate them in opposite directions in synchronism with the rotation of the bearing 26 in the trunnion 29. The nozzle is provided with external fairings 46,47 to provide aerodynamic streamlining when the nozzle 17 is directed rearwards. The fairings are constrained against axial and radial displacement by rollers 48 and grooves 50 at one of their ends. The fairings 46,47 are connected to their respective ducts 22,23 by members 51 so that the fairings rotate with the ducts 22,23.

5 Claims, 4 Drawing Figures

STREAMLINED NOZZLE FOR TURBOMACHINES

This invention relates to vectorable nozzles for turbomachines, that is to say propulsion nozzles which can be directed selectively in predetermined directions relative to the remainder of the turbomachine to produce propulsive thrust in selected directions.

An example of a turbomachine having vectorable nozzles is Rolls-Royce Limited's Pegasus ® gas turbine aero engine which is designed for the Harrier Jump Jet, the AV8A and AV8B aircraft.

The Pegasus ® engine, as designed for the above-mentioned aircraft, comprises a by-pass type gas turbine engine in which part of the by-pass air is discharged through two vectorable nozzles and part is supplied to the core engine to drive the turbine and produce propulsive thrust. The hot efflux gases from the turbine is fed via a bifurcated jet pipe to two vectorable "hot" nozzles. By rotating the nozzles from a direction pointing rearwards to a position pointing downwards the thrust produced by the nozzles may be selectively directed respectively forwards for forward flight or upwards for vertical take-off and landing.

Instead of discharging the efflux of hot gases from the engine's turbines through a bifurcated jet-pipe, and hence from two vectorable nozzles, it is also known to provide a single jet pipe with a nozzle thrust to produce forwards or upwards directed thrust.

With ever increasing speeds of aircraft and the need to reduce weight and cost of such engines, there is a need for vectorable nozzles that are mechanically simple to operate, lightweight and robust and do not present too much drag when the aircraft is flying at high speeds.

The invention, as claimed, provides a vectorable nozzle for a turbomachine, which is simple to operate robust and lightweight and does not present too much aerodynamic drag during high speed forward flight of the aircraft.

Figure 2:
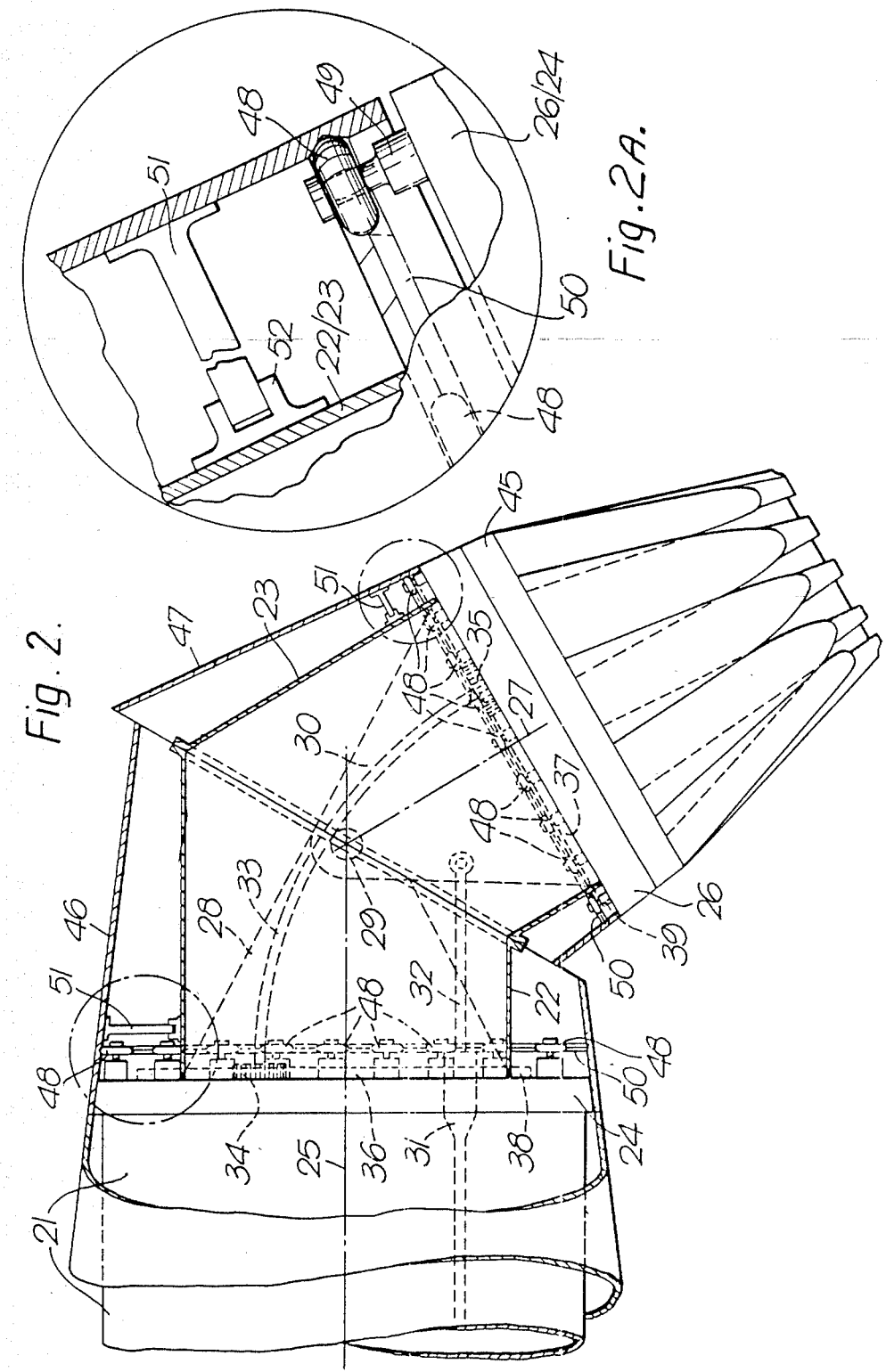
Figure 3:
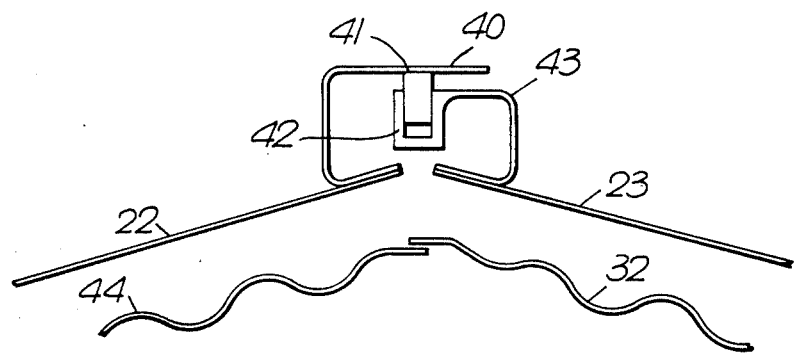

The invention will now be described by way of an example with reference to the accompanying drawings in which:

FIG. 1 illustrates schematically a plan view of a gas turbine engine fitted with a vectorable rear nozzle constructed in accordance with the present invention, FIG. 2 illustrates in greater detail a side view of a rear nozzle suitable for the engine of FIG. 1, incorporating the present invention, FIG. 2A is an enlarged fragmentary detail of the nozzle shown in the dot dash circles of FIG. 2, and FIG. 3 illustrates the joint between the rotatable ducts of the vectorable rear nozzle.

Referring to FIG. 1 there is shown a gas turbine aero engine 10 of the by-pass type. The engine comprises in flow series, an axial flow low pressure compressor 11, an axial flow high pressure compressor 12, a combustion chamber 13, a high pressure turbine 14 which drives the H.P. compressor 12, a low pressure turbine 15 which drives the L.P. compressor 11, and a jet pipe 16 terminating in a vectorable nozzle 17 constructed in accordance with the present invention.

The L.P. compressor 11 supplies compressed air to the H.P. compressor 12 and to a plenum chamber 18 which forms part of the by-pass duct 19 and which terminates in two vectorable nozzles 20.

Referring to FIGS. 2 and 3 the nozzle 17 comprises a first fixed duct 21 and two rotatable ducts 22,23. The second duct 22 is mounted in a first bearing 24 for rotation about its longitudinal axis and is scarfed at its rear end. That is to say that its end lies in a plane which is at an angle to the longitudinal axis 25 of the second duct 22. The third duct 23 is similarly scarfed so that its end adjacent the second duct 22 is parallel to the end of the second duct. The third duct is mounted in a second bearing 26 for rotation about its longitudinal axis 27.

The duct 22 is of circular cross-sectional shape in the plane of the bearing 24 and in the plane of the joint between the ducts 22,23. Similarly, the duct 23 is of circular cross-section in the plane of the joint between the ducts 22,23 and in the plane of the bearing 26.

The fixed duct 21 is provided with two side plates 28 which project parallel to the axis 25 and have trunnions 29, the axis of which extends transverse to the axis 25.

The outer race of the second bearing 26 is provided with two side plates 30 and bushes locate on the trunnions 29 and constrains the bearing 26 to swing bodily about the trunnions 29. The second bearing 26 is rotated bodily about the axes of the trunnions 29 by means of a screw jack which has a lead screw 32 and rotating ball type of nut 31. The nut 31 is fixed to the fixed structure of duct 21 and rotation of the lead screw 32 moves the end of the lead screw 32 in axial directions. The lead screw 32 operates on the plate 30 to swing the bearing 26 bodily about the axis of the trunnions. Simultaneously, the ducts 22 and 23 must be rotated in opposite directions so that the ducts 22 and 23 accommodate the movement of the bearing 26 relative to bearing 24.

A motor is provided to drive a flexible drive shaft 33 that has mounted on it two chain sprockets 34, 35. A chain sprocket 36,37 is provided on each of the ducts 22,23 parallel to the plane of the respective bearing 24 or 26 in which the duct 22,23 rotates. The sprockets 34,35 rotate together in the same direction when the shaft 32 is rotated, and chains 38,39 are provided to transmit the drive from the sprockets 34,35 to the sprockets 36,37. The sprockets 34 engages the outer perimeter of the chain loop 38 whereas the sprockets 35 engages the inner perimeter of the chain loop 39. In this way, the ducts 22 and 23 are driven at the same speed in opposite directions.

Rotation of the shaft 33 must be syncronised with the rotation of the bearing 26 about the trunnions 29 in order not to cause the ducts 22,23 to jam themselves as the bearing 26 rotates.

The joint between the ducts 22,23 is shown in more detail in FIG. 3. Referring to FIG. 3, the duct 22 has a graphite polymide stiffening ring 40 around its circumference at the scarfed end. The ring 40 presents an inward facing circumferential surface against which an annular reinforced carbon seal 41 bears. The seal 41 is accommodated in an outward facing recess 42 provided on a graphite polymide stiffening ring 43 which is secured around the circumference of the duct 23.

The ducts 22,23 are of lightweight thin titanium sheet and a thin heat shield liner 44, carried by each duct 22,23 is located concentrically within each of the ducts 22,23. The liners 44 overlap at the scarfed joint to protect the seal 41 from the hot exhaust gases flowing through the ducts 22,23.

If desired the annular seal 41, and stiffening rings 40 and 43 may be replaced by a third bearing, one race of which is secured to the duct 22, and the other of which is secured to duct 23. In this case the third bearing and the scarfed ends of the ducts 22, 23 are constructed to form a gas tight seal at the joint between the ducts 22,23.

The outer race of the bearing 26 also carries a fourth duct 45 which defines the outlet area of the nozzle. If desired, the fourth duct 45 could be omitted and in this case the outlet area of the nozzle would be defined by the downstream end of the third duct 23 or the inner race of the bearing 26 providing that the bearing itself is shielded from the hot gases flowing through the ducts 22,23. Alternatively, the fourth duct 45 may be provided with means for varying the area of the nozzle outlet.

The ducts 22,23 are provided, around their outside, with a fairing 46,47 which is scarfed in the same plane as the ducts 22,23 when the ducts 22,23 are directed rearwards. The fairing is of circular or elliptical cross-sectional shape and tapers from a circular diameter that accommodates the bearing and blends in with the fixed airframe skin of the aircraft at its upstream end to an elliptical or circular cross section at the scarf plane that accommodates the trunnions and finally to a circular diameter that accommodates the bearing and blends in with the fourth pipe.

The fairing 46 is supported from the duct 22 solely at its upstream end and the fairly 47 is supported from the duct 23 solely at its downstream end. The means of supporting the fairings 46,47 comprises a plurality of captive rollers 48, (or balls) carried in housings 49 mounted on the outer race of the respective bearing. The rollers 48 are aligned on a circumferentially extending line with their axes of rotation lying axially relative to the respective bearing. The rollers 48 engage in a circumferential groove 50 on the inside of the fairings 46,47 to provide constraint against axial and radial movements relative to the ducts 22,23. The rollers allow the ducts 22,23 and the fairings 46,47 to rotate relative to the bearings.

If desired, instead of providing a single groove in each of the fairings 46,47, a plurality of short circumferentially extending grooves could be provided along a common circumferential line. In this case one or more rollers could be provided for each groove. Of course, the groove could be provided in the outer surface of the ducts 22,23 instead of in the fairings 46,47. Alternatively confronting grooves could be provided in both the fairings 46,47 and the ducts 22,23.

Other means of constraining the fairings 46,47 against axial and radial movement relative to the ducts 22,23 may be used, instead of rolling elements such as rollers or balls. For example, the rollers could be replaced by a circumferentially extending wire, or structural members which rigidly attach the fairings 46,47 to their respective inner ducts 22 and 23.

Rotational drive to the fairings to move the fairings 46,47 with its respective duct 22,23 is by way of radially extending members 51 provided at two locations positioned axially and circumferentially so as to clear the trunnions.

The members 51 locate in recesses 52 in the outside of the ducts 22,23.

In operation, when the aircraft in which the engine is installed is flying at high subsonic or supersonic speeds, the nozzle is directed rearwards and the fairings 46,47 provide a smooth profile and reduce drag.

If the fairings 46 and 47 are constructed with a circular cross-sectional shape there will be a mismatch of these fairings at their scarf plane during VTOL mode of operation. Although this produces a smoother fairing profile during non-vectored mode of operation it will produce higher drag, due to the mismatch, during vectored flight. This however will not impose too great a problem, having regard to the fact that, in general terms, the aircraft, in the VTOL mode does not have an efficient aerodynamic profile as when it is flying forward.

If the fairings 46 and 47 are constructed with an elliptical cross-sectional shape such that the cross-sectional shape at their scarf plane is circular, as with ducts 22 and 23, there will be no mismatch of the fairing ducts 46 and 47 at their scarf plane during VTOL mode of operation.

I claim:

1. A vectorable nozzle for a turbomachine comprising; a first duct; a second duct mounted in a first bearing for rotation relative to the first duct about a longitudinal axis of the second duct, the second duct terminating at a downstream end thereof in a plane inclined relative to a plane normal to said longitudinal axis of said second duct; a third duct mounted in a second bearing and having a longitudinal axis, said third duct being rotatable about said longitudinal axis of said third duct relative to the second duct, the third duct terminating at an upstream end thereof in a plane substantially parallel to the downstream end of the second duct, said downstream end of said second duct and said upstream end of said third duct defining a scarf joint therebetween drive means operable to rotate each the second and third ducts in opposite directions about their respective axes of rotation and operable to cause the second bearing to swing bodily about an axis transverse to the length of the second duct; a first outer fairing encompassing the second duct, the first fairing being mounted relative to the second duct at its upstream end and terminating at its downstream end in a plane substantially parallel to the joint between the second and third ducts; a first constraining means operable to constrain the first fairing against axial movement relative to the second duct; a first connector means interconnecting the first fairing and the second duct whereby rotational movement of the second duct is transmitted to the first fairing to rotate it with the second duct; a second outer fairing encompassing the third duct, the second fairing being mounted relative to the third duct at its downstream end and terminating at its upstream end in a plane substantially parallel to the downstream end of the first fairing; a second constraining means operable to constrain the second fairing against axial movement relative to the third duct; and a second connector means interconnecting the second fairing to the third duct whereby rotational movement of the third duct relative to the second duct is transmitted to the second fairing to rotate it with the third duct.

2. A vectorable nozzle according to claim 1 wherein each of the first and second constraining means for said first and second fairings respectively comprises at least one circumferentially extending groove in a respective inner surface of the first and second fairings, and a plurality of rollers effectively carried by the respective second and third ducts with which the respective fairings co-operate, the rollers being constrained to run in the respective grooves and thereby limit relative axial movement between the fairings and the respective ducts.

3. A vectorable nozzle according to claim 1 wherein each of the first and second connector means for said first and second fairings respectively comprises at least one member secured at one end to a respective one of the first and second fairings and located at its other end in a recess in the respective second or third duct.

4. A vectorable nozzle according to claim 1 wherein each of the first and second connector means for said first and second fairings respectively comprises at least one member secured at one end to a respective one of the second and third ducts and located at its other end in a recess in the respective first or second fairing.

5. A vectorable nozzle according to claim 1 wherein said first and second fairings have a profile which tapers from a larger cross-sectional dimension of the fairings in a plane radially through said first bearing to a smaller cross-sectional dimension of the fairings in a plane radially through said second bearing when said second and third ducts are aligned with the longitudinal axes extending generally in the same direction.

* * * * *